United States Patent
Steele et al.

(10) Patent No.: US 10,647,594 B2
(45) Date of Patent: May 12, 2020

(54) CONDENSATION CATALYST SYSTEMS AND METHODS

(71) Applicant: HAMILTON SUNDSTRAND CORPORATION, Charlotte, NC (US)

(72) Inventors: John W. Steele, New Hartford, CT (US); Barbara M. Peyton, Windsor, CT (US); Tony Rector, East Granby, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 411 days.

(21) Appl. No.: 15/387,194

(22) Filed: Dec. 21, 2016

(65) Prior Publication Data

US 2018/0170771 A1    Jun. 21, 2018

(51) Int. Cl.
| | | |
|---|---|---|
| *B01J 20/20* | (2006.01) | |
| *B01J 29/06* | (2006.01) | |
| *B01J 31/06* | (2006.01) | |
| *B01J 31/26* | (2006.01) | |
| *B01J 47/12* | (2017.01) | |
| *C02F 1/28* | (2006.01) | |
| *C02F 1/42* | (2006.01) | |
| *C02F 101/30* | (2006.01) | |
| *C02F 103/02* | (2006.01) | |

(52) U.S. Cl.
CPC .............. *C02F 1/281* (2013.01); *B01J 20/20* (2013.01); *B01J 29/061* (2013.01); *B01J 31/06* (2013.01); *B01J 31/26* (2013.01); *B01J 47/12* (2013.01); *C02F 1/283* (2013.01); *C02F 1/42* (2013.01); *C02F 2101/30* (2013.01); *C02F 2103/023* (2013.01); *C02F 2201/001* (2013.01)

(58) Field of Classification Search
CPC ... B01J 20/20; B01J 29/06; B01J 31/06; B01J 31/26; B01J 35/02; B01J 47/12; C02F 1/281; C02F 1/283; C02F 1/42; C02F 1/66; C02F 1/586; C02F 2101/30; C02F 2201/001

See application file for complete search history.

(56) References Cited

U.S. PATENT DOCUMENTS

| | | | | |
|---|---|---|---|---|
| 4,938,939 | A | * | 7/1990 | Kuznicki ................. B01J 29/89 423/326 |
| 7,393,381 | B2 | | 7/2008 | Tower et al. |
| 7,638,060 | B2 | | 12/2009 | Nemeth et al. |
| 9,480,944 | B2 | | 11/2016 | Ballantyne et al. |
| 2001/0012820 | A1 | * | 8/2001 | Nishijima .............. B01D 53/02 502/401 |
| 2002/0170815 | A1 | * | 11/2002 | Fujii .................... B01D 53/007 204/157.3 |
| 2005/0236335 | A1 | * | 10/2005 | Karaman .................. C02F 1/28 210/665 |

OTHER PUBLICATIONS

U.S. Appl. No. 15/242,841, filed Aug. 22, 2016 entitled "Hydrophilic Composition with Condensation Catalyst".

* cited by examiner

*Primary Examiner* — Lucas A Stelling
(74) *Attorney, Agent, or Firm* — Snell & Wilmer, L.L.P.

(57) ABSTRACT

A reactor system may comprise a housing; and a condensation catalyst layer within the housing comprising a condensation catalyst comprised of at least one of a base-substituted zeolite, a stannous salt, or a phosphonitrile chloride. The condensation catalyst layer may be configured to catalyze a condensation reaction of a plurality of silane diols in water flowing through the housing into a plurality of siloxanes.

14 Claims, 2 Drawing Sheets

CONDENSATION CATALYST SYSTEMS AND METHODS

FIELD

This disclosure relates to systems and methods for a condensation catalyst.

BACKGROUND

Self-contained habitable systems, such as the International Space Station (ISS), utilize a Water Processor Assembly (WPA) to treat and clean water for crew consumption. Prior to consumption, the treated water is tested for quality, which includes the detection of total organic carbon. In response to a high total organic carbon reading in the water, multifiltration (MF) beds in the WPA (comprising ion exchange resins and organic sorbents) may be changed. Silane diols, such as dimethylsilanediol, in water is not hazardous for crew consumption, nor does the presence of silane diols necessitate replacement of the MF beds. However, the presence of silane diols in water may result in a high total organic carbon reading, therefore causing the MF beds to be unnecessarily changed.

SUMMARY

In various embodiments, a reactor system may comprise a housing; and a condensation catalyst layer within the housing comprising a condensation catalyst comprised of at least one of a base-substituted zeolite, a stannous salt, or a phosphonitrile chloride. The condensation catalyst layer may be configured to catalyze a condensation reaction of a plurality of silane diols in water flowing through the housing into a plurality of siloxanes. The plurality of silane diols may be a plurality of dimethylsilanediol molecules. In various embodiments, the condensation catalyst may comprise ammonium-substituted zeolite. In various embodiments, the condensation catalyst may further comprise a binder, which may comprise kaolin and/or carboxymethylcellulose. In various embodiments, the condensation catalyst may be pelletized.

In various embodiments, the reactor system may comprise at least one filter in the housing adjacent to the condensation catalyst layer. In various embodiments, the reactor system may comprise an ion exchange resin layer in the housing adjacent to the at least one filter. In various embodiments, the reactor system may comprise an activated carbon layer in the housing adjacent to the at least one filter. In various embodiments, the reactor system may comprise at least one of an activated carbon layer or a synthetic carbon layer in the housing downstream of the condensation catalyst layer, wherein the at least one of the activated carbon layer or the synthetic carbon layer is configured to capture the plurality of siloxanes.

In various embodiments, a fluid treatment system may comprise an air conditioner; a reactor system fluidly coupled to the air conditioner downstream of the air conditioner, the reactor system comprising a housing and a condensation catalyst within the housing comprising at least one of a base-substituted zeolite, a stannous salt, or a phosphonitrile chloride, wherein the condensation catalyst is configured to catalyze a condensation reaction of a plurality of silane diols in water flowing through the housing into a plurality of siloxanes; and/or a water processor assembly fluidly coupled to the reactor system, downstream of the reactor system.

In various embodiments, the condensation catalyst may comprise ammonium-substituted zeolite. In various embodiments, the condensation catalyst may further comprise a binder. The binder may comprise kaolin and carboxymethylcellulose. In various embodiments, the reactor system may further comprise at least one of an activated carbon layer or a synthetic carbon layer in the housing downstream of the condensation catalyst, wherein the at least one of the activated carbon layer or the synthetic carbon layer is configured to capture the plurality of siloxanes.

In various embodiments, a water processor assembly may comprise an inlet; and a multifiltration bed fluidly coupled to the inlet, downstream of the inlet, wherein the multifiltration bed comprises a condensation catalyst layer comprising a condensation catalyst comprised of at least one of a base-substituted zeolite, a stannous salt, or a phosphonitrile chloride. The condensation catalyst layer may be configured to catalyze a condensation reaction of a plurality of silane diols in water flowing through the multifiltration bed into a plurality of siloxanes. In various embodiments, the condensation catalyst may comprise ammonium-substituted zeolite. In various embodiments, the condensation catalyst may further comprise a binder. The binder comprises kaolin and carboxymethylcellulose. In various embodiments, the multifiltration bed may further comprise at least one of an ion exchange layer or an activated carbon layer at least one of upstream or downstream of the condensation catalyst layer.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures. In the figures, like referenced numerals may refer to like parts throughout the different figures unless otherwise specified.

DETAILED DESCRIPTION

Figure 1:
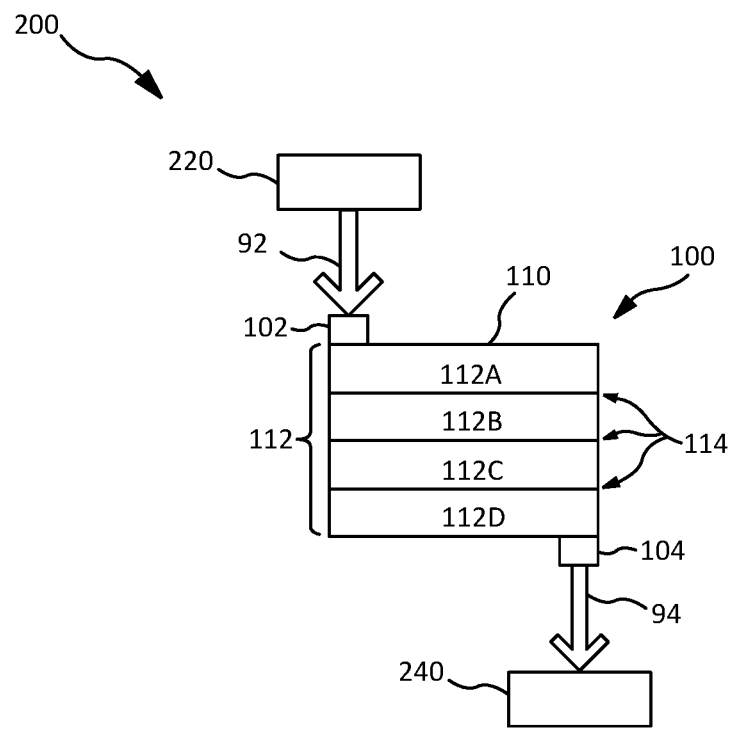
FIG. 1 illustrates fluid treatment system comprising a reactor system, in accordance with various embodiments.

All ranges may include the upper and lower values, and all ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Self-contained habitable systems, such as the ISS, may comprise a fluid treatment system for the treatment of air and/or water. The air and/or water may be filtered and treated to remove toxic contaminants by filters or sorbent beds, which periodically need to be replaced. As described herein, the presence of silane diols (e.g., dimethylsilanediol (DMSD)) in water in observed concentrations does not cause the water to be toxic to inhabitants of the self-contained habitable system. However, because the presence of DMSD causes the water quality testing to read a high level of total organic carbon, the filters and/or sorbent bed may be unnecessarily replaced as a result of the high total organic carbon reading. The chemical structure of DMSD is shown in DIAGRAM 1, below:

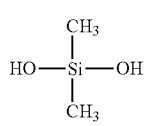

DIAGRAM 1

DMSD may be formed in such habitable systems by the hydrolysis of siloxanes existing in the air. Siloxanes may be evaporated into the air from personal care products such as skin lotions, creams, shampoos, etc. The siloxanes may enter into an air conditioner of the fluid treatment system. A condensing heat exchanger in the air conditioner may be configured to remove moisture from the air, and may condense water and the siloxanes out of the air on an organic hydrophilic coating on the condensing heat exchanger. The hydrophilic coating may be comprised of about 10 to about 30 parts by weight of an adhesive agent, about 10 to about 20 parts by weight of an inorganic compound, about 3 to about 10 parts by weight of an insolubilizer, and about 0.3 to about 1.5 parts by weight of an antimicrobial agent. In various embodiments, the adhesive agent may be selected from potassium silicate, lead borosilicate glass frit, and mixtures thereof. In various embodiments, the inorganic compound may comprise silica, calcium silicate, and mixtures thereof. In various embodiments, the insolubilizer may comprise silicofluorides, inorganic oxides, and mixtures thereof. The silicofluorides may be silicofluorides of sodium, potassium, barium, manganese, or mixtures of these. In various embodiments, the antimicrobial agent may comprise at least one of arsenic, iodine, iron, mercury, silver, and tin, which may initially be salts during preparation of the hydrophilic coating.

In response to water and siloxanes condensing from the air onto the organic hydrophilic coating, the organic hydrophilic coating may catalyze hydrolysis of the siloxanes to form silane diols (e.g., DMSD), as shown in DIAGRAM 2. The water and DMSD may then be sent to a collector for processing in a water processing assembly (WPA), in which, if not removed from the water, the DMSD will cause a high total organic carbon reading of the water, as described herein.

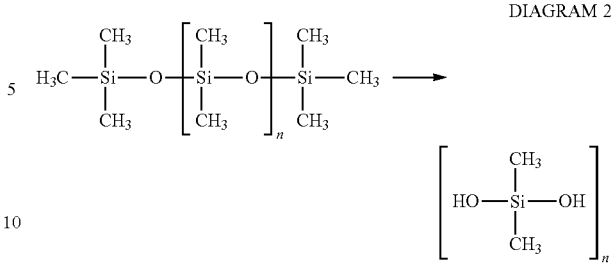

DIAGRAM 2

In various embodiments, with reference to FIG. 1, a reactor system 100 may comprise a housing 110, an inlet 102, and an outlet 104. With combined reference to FIGS. 1 and 2, housing 110 may be packed with a condensation catalyst 115. Condensation catalyst 115 may be configured to remove DMSD from water traveling through reactor system 100. Inlet water 92 containing various contaminants may enter reactor system 100 through inlet 102, and pass through housing 110. Condensation catalyst 115 may remove DMSD from the water by catalyzing a condensation reaction of DMSD, resulting in the formation of siloxanes, as shown in DIAGRAM 3, and then capture the DMSD in condensation catalyst 115, or another suitable material, as described herein. Therefore, outlet water 94 may be free of DMSD or have a reduced concentration of DMSD relative to water passing through inlet 102.

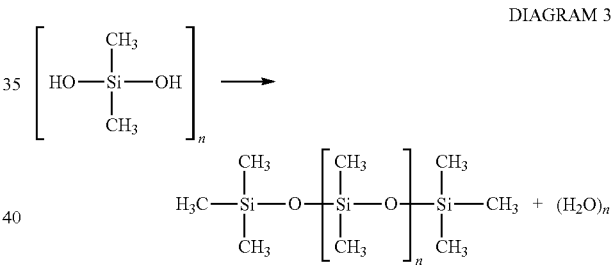

DIAGRAM 3

Condensation catalyst 115, in various embodiments, may comprise a catalyst, such as a protic acid, Lewis acid, strong charged base, weak uncharged base, base-substituted zeolite, a stannous salt, and/or phosphonitrile chloride, configured to catalyze the condensation reaction of DMSD to form siloxanes. Zeolite may be a substance comprising silica ($SiO_2$) and alumina ($Al_2O_3$), with a silica to alumina mole ratio of 23. In various embodiments, the catalyst in condensation catalyst 115 may comprise a base-substituted zeolite, which may be an ammonium-substituted zeolite.

In various embodiments, condensation catalyst 115 may comprise a binder, such as a glue, diluent, and/or filler. The binder may be a mixture of kaolin (layered silica and alumina) and carboxymethylcellulose. The catalyst and binder may be combined to form a catalyst mixture, which is then extruded to form a desired shape (e.g., pellets 121, beads, pills, tablets, extrudates, and/or any other suitable form of condensation catalyst 115). In various embodiments, condensation catalyst 115 may comprise pellets 121 of any suitable size. In various embodiments, pellets 121 may comprise a pellet size between 50 mesh (297 microns (0.0117 inch)) and 16 mesh (1190 microns (0.0469 inch)), or between 40 mesh (400 microns (0.0165 inch)) and 25 mesh (707 microns (0.0280 inch)).

In various embodiments, housing 110 may comprise one or more sorbent layers 112, which may be configured to remove and/or absorb contaminants in water entering reactor system 100 through inlet 102. In various embodiments, housing 110 may comprise a single sorbent layer 112 packed with at least condensation catalyst 115. In various embodiments, any of sorbent layers 112, and/or any number of sorbent layers 112, may comprise condensation catalyst 115. A sorbent layer 112 comprising condensation catalyst 115 may be referred to as a condensation catalyst layer. Sorbent layer(s) 112 may be any suitable size. In various embodiments, for example, housing 110 may comprise a single sorbent layer 112, which comprises condensation catalyst 115. In various embodiments, as another example, housing 110 may comprise one sorbent layer 112 comprising condensation catalyst 115 (which may be pelletized condensation catalyst) that occupies a majority of housing 110, and a second sorbent layer 112 comprising another material, such as activated carbon and/or synthetic carbon. A sorbent layer 112 comprising activated carbon may be referred to as an activated carbon layer. Likewise, a sorbent layer 112 comprising synthetic carbon may be referred to as a synthetic carbon layer.

In various embodiments, housing 110 may comprise filters 114 separating sorbent layers 112. Filters 114 may be any suitable material configured to separate sorbent layers 112 while allowing water to flow between sorbent layers 112. Filters 114 may comprise stainless steel, polytetrafluoroethylene, polyethylene, polypropylene, and/or the like, and may be perforated. At least one filter 114 may be adjacent to a condensation catalyst layer of sorbent layers 112, wherein at least one sorbent layer 112 comprising another material may be adjacent to the condensation catalyst layer, with a filter 114 separating such sorbent layers 112. For example, sorbent layers 112A-C may be a condensation catalyst layer, with sorbent layer 112D comprising another material. The other material may be an ion exchange resin (for softening the water passing through by removing calcium and/or magnesium ions, for example) and/or activated or synthetic carbon (for absorbing and/or storing siloxane molecules formed by the condensation reaction of DMSD as show in DIAGRAM 3 via condensation catalyst 115). In various embodiments, at least one sorbent layer 112 comprising another material (other than condensation catalyst 115), for example, other materials described herein, may be disposed upstream and/or downstream of a condensation catalyst layer. A sorbent layer 112 configured to capture siloxanes formed from DMSD reacting with condensation catalyst 115 (e.g., a sorbent layer 112 comprising activated and/or synthetic carbon) may be disposed downstream of the condensation catalyst layer.

Figure 2:
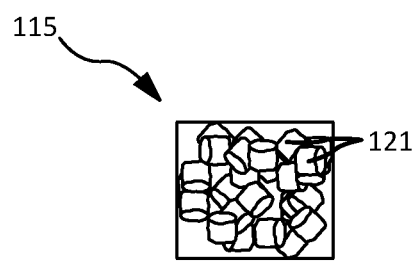
FIG. 2 illustrates a condensation catalyst, in accordance with various embodiments.

In various embodiments, with continued reference to FIGS. 1 and 2, reactor system 100 may be comprised in a fluid treatment system 200. Fluid treatment system 200 may comprise an air conditioner 220 fluidly coupled to reactor system 100 upstream of reactor system 100, and/or a water processing assembly (WPA) 240 fluidly coupled to reactor system 100 downstream of reactor system 100. As described herein, air comprising siloxanes may be taken in by air conditioner 220, in which water with siloxanes is condensed on an organic hydrophilic coating of a heat exchanger. The organic hydrophilic coating may catalyze the hydrolysis of the siloxanes into silane diols (e.g., DMSD), which, in response, flows in the condensed water as inlet water 92 to reactor system 100. The water with DMSD flows through reactor system 100, comprising condensation catalyst 115, which catalyzes a condensation reaction, forming siloxanes from the DMSD molecules, as shown in DIAGRAM 3, herein. Additionally, in embodiments in which reactor system 100 comprises sorbent layers 112 comprising ion exchange resin and/or activated or synthetic carbon, the water may be softened (i.e., removing and/or exchanging certain ions such as magnesium or calcium ions from the water) by the ion exchange resin layer(s), and/or the formed siloxanes may be absorbed and/or captured by the activated and/or synthetic carbon layer(s). Condensation catalyst 115, activated carbon, and/or synthetic carbon may be porous, and therefore, may capture formed siloxanes in the porosity of such materials. Additionally, sorbent layers 112 comprising activated and/or synthetic carbon, or any other suitable materials, may be configured to absorb other contaminants in the water.

In response to the water traveling through reactor system 100, output water 96, which may be free of, or have a reduced concentration of, DMSD and other contaminants, may be sent to WPA 240. As a result, the water being tested for quality within or after processing in the WPA should not show a high total organic carbon reading because of the presence of silane diols (e.g., DMSD). Therefore, filters and/or sorbent beds may not be changed prematurely.

Figure 3:
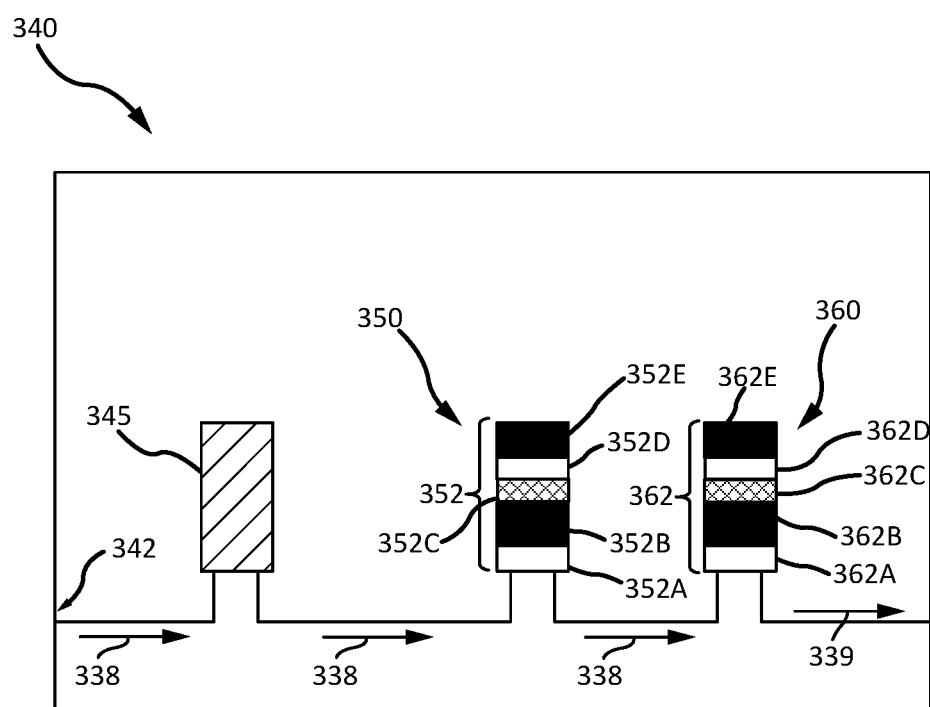
FIG. 3 illustrates a water processing assembly, in accordance with various embodiments.

In various embodiments, with combined reference to FIGS. 1 and 3, reactor system 100 may be comprised in WPA 340 (similar to WPA 240 in FIG. 1) as a multifiltration (MF) bed 350 and/or 360, rather than as, or in addition to being, a separate system from WPA 240 as depicted in FIG. 1. In accordance with various embodiments, WPA 340 may comprise one or more MF beds (such as MF beds 350 and 360). WPA 340 may process water coming from an air conditioner (such as air conditioner 220), entering WPA 340 through inlet 342, and flowing in direction 338. WPA 340 may comprise a particulate filter 345 and/or one or more MF beds 350, 360. Particulate filter 345 may remove particulate from water flowing in direction 338. MF beds 350 and/or 360 may comprise sorbent layers 352 and 362. Similar to sorbent layers 112 in FIG. 1, one or more of sorbent layers 352, 362 in MF beds 350, 360 may comprise condensation catalyst 115. In various embodiments, a MF bed, such as one of MF beds 350 and/or 360, may only comprise condensation catalyst 115. As depicted in FIG. 3, sorbent layers 352C and 362C may comprise condensation catalyst 115, making sorbent layers 352C and 362C condensation catalyst layers, which are configured to catalyze the condensation of DMSD molecules to form siloxanes. Thus, output water 339 may be free of DMSD or have a reduced concentration of DMSD relative to water at the inlet, and therefore, DMSD will not significantly contribute to a high total organic reading of the processed water, if at all.

Sorbent layers 352 and 362 that do not comprise condensation catalyst 115 (sorbent layers 352A, 352B, 352D, and 352E, and 362A, 362B, 362D, and 362E, as depicted in FIG. 3) may comprise other compounds (e.g., ion exchange resins, activate and/or synthetic carbon, etc.) configured to soften and/or remove other contaminants from the water going through WPA 340. In various embodiments, only one MF bed may comprise condensation catalyst 115 or a condensation catalyst layer, or any number of MF beds present in WPA 340 may comprise one or more condensation catalyst layers. Additionally, sorbent layers 352 and 362 may be disposed in any suitable configuration. For example, a condensation catalyst layer(s) may be downstream and/or upstream of any other sorbent layer 352 and/or 362.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method, comprising:
   causing water and a plurality of silane diols to contact a condensation catalyst comprised in a reactor system, wherein the condensation catalyst comprises a base-substituted zeolite; and
   reacting the plurality of silane diols with the condensation catalyst to form a plurality of siloxanes.

2. The method of claim 1, wherein the condensation catalyst comprises ammonium-substituted zeolite.

3. The method of claim 2, wherein the condensation catalyst further comprises a binder.

4. The method of claim 3, wherein the binder comprises kaolin and carboxymethylcellulose.

5. The method of claim 1, further comprising:
   condensing the water and a first plurality of siloxanes out of air onto a surface comprising a hydrophilic coating prior to the causing the water and the plurality of silane diols to contact the condensation catalyst; and
   forming the plurality of silane diols via a reaction between the hydrophilic coating and the first plurality of siloxanes.

6. The method of claim 5, further comprising at least one of removing or exchanging ions comprised in the water by contacting the water with an ion exchange resin layer in a fluid treatment system which comprises the reactor system.

7. The method of claim 5, further comprising capturing the plurality of siloxanes by causing the water to contact at least one of an activated carbon or a synthetic carbon downstream of the condensation catalyst.

8. The method of claim 1, wherein the condensation catalyst is pelletized.

9. The method of claim 1, wherein the plurality of silane diols is a plurality of dimethylsilanediol molecules.

10. A fluid treatment system, comprising:
    an air conditioner comprising a heat exchanger, wherein the heat exchanger comprises a hydrophilic coating that condenses water and siloxanes out of air, wherein the hydrophilic coating and the siloxanes react to form a plurality of silane diols; and
    a reactor system fluidly coupled to the air conditioner downstream of the air conditioner, wherein the water and the plurality of silane diols, from the air conditioner, flow to the reactor system, wherein the reactor system comprises a housing and a condensation catalyst within the housing comprising a base-substituted zeolite, wherein the water and the plurality of silane diols flow through the reactor and contact the condensation catalyst, which catalyzes a condensation reaction of the plurality of silane diols flowing through the housing into a plurality of siloxanes.

11. The fluid treatment system of claim 10, wherein the condensation catalyst comprises ammonium-substituted zeolite.

12. The fluid treatment system of claim 11, wherein the condensation catalyst further comprises a binder.

13. The fluid treatment system of claim 12, wherein the binder comprises kaolin and carboxymethylcellulose.

14. The fluid treatment system of claim 10, wherein the reactor system further comprises at least one of an activated carbon layer or a synthetic carbon layer in the housing downstream of the condensation catalyst, wherein the at least one of the activated carbon layer or the synthetic carbon layer is configured to capture the plurality of siloxanes.

* * * * *